(12) United States Patent
Dubnicka et al.

(10) Patent No.: US 12,521,910 B2
(45) Date of Patent: Jan. 13, 2026

(54) SAW CART

(71) Applicant: MILWAUKEE ELECTRIC TOOL CORPORATION, Brookfield, WI (US)

(72) Inventors: Travis J. Dubnicka, Menomonee Falls, WI (US); Erik A. Freeberg, Oconomowoc, WI (US); Katie M. Cameron, Milwaukee, WI (US); Terry L. Timmons, Oconomowoc, WI (US); Paul W. Eiche, Oconomowoc, WI (US); Samuel Becker, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 400 days.

(21) Appl. No.: 18/181,010

(22) Filed: Mar. 9, 2023

(65) Prior Publication Data

US 2023/0286192 A1    Sep. 14, 2023

Related U.S. Application Data

(60) Provisional application No. 63/481,862, filed on Jan. 27, 2023, provisional application No. 63/318,172, filed on Mar. 9, 2022.

(51) Int. Cl.
*B28D 7/00* (2006.01)
*B28D 1/04* (2006.01)
(Continued)

(52) U.S. Cl.
CPC ............ *B28D 7/00* (2013.01); *B28D 1/045* (2013.01); *B62B 3/00* (2013.01); *B62B 3/02* (2013.01); *B62B 2202/48* (2013.01)

(58) Field of Classification Search
CPC . B28D 7/00; B28D 1/045; B28D 3/00; B28D 3/02
See application file for complete search history.

(56) References Cited

U.S. PATENT DOCUMENTS

| | | | |
|---|---|---|---|
| 1,106,225 | A | 8/1914 | Kreeger |
| 2,435,192 | A | 2/1948 | Arsneau |

(Continued)

FOREIGN PATENT DOCUMENTS

| | | | |
|---|---|---|---|
| CN | 201041043 Y | 3/2008 | |
| CN | 105397921 A | 3/2016 | |

(Continued)

OTHER PUBLICATIONS

European Patent Office Action for Application No. 23161054.4 dated Jun. 12, 2025 (9 pages).

*Primary Examiner* — Nathaniel C Chukwurah
(74) *Attorney, Agent, or Firm* — Michael Best & Friedrich LLP

(57) ABSTRACT

A cart for carrying a saw having a saw blade, a motor drivably coupled to the saw blade, a saw control unit to selectively activate the motor in response to a first input control signal from a trigger, and a first connector in communication with the saw control unit. The cart includes a remote actuation system having a cart control unit, a throttle configured to provide an input to the cart control unit, and a second connector configured to connect with the first connector of the saw. The cart also includes a wire interconnecting the cart control unit and the first connector. The wire configured to transmit a second input control signal from the cart control unit to the saw control unit upon receiving the input from the throttle, via the first and second connectors, to selectively activate and vary a rotational speed of the motor and the saw blade.

21 Claims, 14 Drawing Sheets

(51) Int. Cl.
    *B62B 3/00*     (2006.01)
    *B62B 3/02*     (2006.01)

(56)          References Cited

U.S. PATENT DOCUMENTS

| | | | |
|---|---|---|---|
| 2,455,369 | A | 12/1948 | Kuykendall |
| 2,468,336 | A | 4/1949 | Lewis |
| 2,635,649 | A | 4/1953 | Brownlee |
| 2,673,725 | A | 3/1954 | Coates |
| 2,701,134 | A | 2/1955 | Klicpera |
| 2,736,350 | A | 2/1956 | Hill et al. |
| 2,736,544 | A | 2/1956 | Wright |
| 2,765,822 | A | 10/1956 | Smith |
| 2,934,327 | A | 4/1960 | Lewis |
| 2,973,950 | A | 3/1961 | Ray |
| 3,301,601 | A | 1/1967 | Zuzelo |
| 3,357,745 | A | 12/1967 | Cooper |
| 3,675,689 | A | 7/1972 | Rice |
| 3,747,981 | A | 7/1973 | Zuzelo |
| 4,175,788 | A | 11/1979 | Jacobson et al. |
| 4,310,198 | A | 1/1982 | Destree |
| 4,676,557 | A | 6/1987 | Shope et al. |
| 4,769,201 | A | 9/1988 | Chiuminatta et al. |
| 4,840,431 | A | 6/1989 | Jedick |
| 4,848,845 | A | 7/1989 | Kennedy |
| 4,889,675 | A | 12/1989 | Chiuminatta et al. |
| 4,921,308 | A | 5/1990 | Yelton et al. |
| 4,928,662 | A | 5/1990 | Chiuminatta et al. |
| 4,938,201 | A | 7/1990 | Chiuminatta et al. |
| 4,953,523 | A | 9/1990 | Swan |
| 5,056,499 | A | 10/1991 | Chiuminatta et al. |
| 5,086,750 | A | 2/1992 | Chiuminatta et al. |
| 5,104,195 | A | 4/1992 | Zaccho |
| 5,167,215 | A | 12/1992 | Harding |
| 5,184,597 | A | 2/1993 | Chiuminatta et al. |
| 5,241,946 | A | 9/1993 | Yelton et al. |
| 5,305,729 | A | 4/1994 | Chiuminatta et al. |
| 5,381,780 | A | 1/1995 | Yelton et al. |
| 5,429,109 | A | 7/1995 | Chiuminatta et al. |
| 5,435,294 | A | 7/1995 | Williamson |
| 5,441,033 | A | 8/1995 | Chiuminatta et al. |
| 5,452,943 | A | 9/1995 | Campbell |
| 5,477,844 | A | 12/1995 | Meister |
| 5,505,189 | A | 4/1996 | Chiuminatta et al. |
| 5,507,273 | A | 4/1996 | Chiuminatta et al. |
| 5,570,677 | A | 11/1996 | Chiuminatta et al. |
| 5,575,271 | A | 11/1996 | Chiuminatta et al. |
| 5,579,753 | A | 12/1996 | Chiuminatta et al. |
| 5,579,754 | A | 12/1996 | Chiuminatta et al. |
| 5,582,899 | A | 12/1996 | Chiuminatta et al. |
| 5,666,939 | A | 9/1997 | Chiuminatta et al. |
| 5,669,371 | A | 9/1997 | Rupprecht et al. |
| 5,676,126 | A | 10/1997 | Rupprecht et al. |
| 5,680,854 | A | 10/1997 | Kinglsey et al. |
| 5,690,391 | A | 11/1997 | Kingsley et al. |
| 5,709,200 | A | 1/1998 | Mertes |
| 5,725,282 | A | 3/1998 | Masseth, Jr. et al. |
| 5,762,349 | A | 6/1998 | Gancarz |
| 5,803,071 | A | 9/1998 | Chiuminatta et al. |
| 5,809,985 | A | 9/1998 | Kingsley et al. |
| 5,810,448 | A | 9/1998 | Kingsley et al. |
| 5,941,227 | A | 8/1999 | Bearden |
| 5,950,612 | A | 9/1999 | Zuzelo et al. |
| 6,019,433 | A | 2/2000 | Allen |
| 6,112,736 | A | 9/2000 | Bearden |
| 6,349,712 | B1 | 2/2002 | Halstead |
| 6,390,086 | B1 | 5/2002 | Collins et al. |
| 6,478,666 | B1 | 11/2002 | Berger et al. |
| 6,484,711 | B2 | 11/2002 | Acker et al. |
| 6,536,422 | B1 | 3/2003 | Zuzelo et al. |
| 6,595,840 | B1 | 7/2003 | Jaensch et al. |
| 6,637,423 | B1 | 10/2003 | Rettenweber et al. |
| 6,687,972 | B1 | 2/2004 | Governo |
| 6,837,501 | B1 | 1/2005 | Hedrick |
| 6,874,493 | B2 | 4/2005 | Glenn |
| 6,981,494 | B1 | 1/2006 | Bowman |
| 6,990,972 | B2 | 1/2006 | Markley |
| 6,996,909 | B1 | 2/2006 | Buck et al. |
| 7,000,605 | B2 | 2/2006 | Due |
| 7,080,851 | B2 | 7/2006 | Schipper |
| 7,144,311 | B2 | 12/2006 | Jaensch |
| 7,159,586 | B2 | 1/2007 | Governo |
| 7,284,547 | B2 | 10/2007 | Governo |
| 7,311,100 | B1 | 12/2007 | Siewers |
| 7,422,292 | B2 | 9/2008 | Johnson et al. |
| 7,451,757 | B2 | 11/2008 | Ketterhagen et al. |
| 7,469,694 | B2 | 12/2008 | Howard et al. |
| 7,487,770 | B2 | 2/2009 | Johnson et al. |
| 7,490,599 | B2 | 2/2009 | Governo |
| 7,497,522 | B2 | 3/2009 | Thornton et al. |
| 7,669,589 | B2 | 3/2010 | Kinglsey et al. |
| 7,704,123 | B2 | 4/2010 | Marsic et al. |
| 7,905,223 | B2 | 3/2011 | Von Siegroth et al. |
| 7,909,410 | B2 | 3/2011 | Collister et al. |
| 8,186,762 | B2 | 5/2012 | Aronsson et al. |
| 8,347,872 | B2 | 1/2013 | Gobright |
| 8,360,045 | B2 | 1/2013 | Marsic et al. |
| 8,640,685 | B2 | 2/2014 | Marsic et al. |
| 8,650,997 | B1 | 2/2014 | Simon |
| 8,931,471 | B2 | 1/2015 | Ruffner et al. |
| 8,984,718 | B2 | 3/2015 | Ejdehag et al. |
| 9,027,542 | B2 | 5/2015 | Ronzello, Sr. et al. |
| 9,156,188 | B2 | 10/2015 | Merck et al. |
| 9,168,665 | B2 | 10/2015 | Simon |
| 9,174,359 | B2 | 11/2015 | Marsic et al. |
| 9,267,620 | B2 | 2/2016 | Sjodahl et al. |
| 9,561,574 | B2 | 2/2017 | Wisenbaker |
| 9,782,915 | B2 | 10/2017 | Carlsson |
| 9,808,961 | B2 | 11/2017 | Jenkins |
| 9,844,868 | B1 | 12/2017 | Abbey et al. |
| 10,160,467 | B2 | 12/2018 | Josephsen |
| 10,240,306 | B2 | 3/2019 | Lorenz |
| 10,246,837 | B2 | 4/2019 | Lorenz |
| 10,272,556 | B2 | 4/2019 | Wilson |
| 10,358,791 | B2 | 7/2019 | Gustafsson et al. |
| 10,369,723 | B2 | 8/2019 | Rieger |
| 10,370,820 | B2 | 8/2019 | Gustafsson et al. |
| 10,675,727 | B1 | 6/2020 | Casey |
| 10,675,782 | B2 | 6/2020 | Merck et al. |
| 10,703,017 | B2 | 7/2020 | Merck et al. |
| 10,711,433 | B2 | 7/2020 | Gustafsson |
| 10,724,189 | B1 | 7/2020 | Lorenz |
| 10,792,836 | B2 | 10/2020 | Rybka et al. |
| 11,001,287 | B2 * | 5/2021 | Ariturk .................... B62B 3/04 |
| 11,035,097 | B2 | 6/2021 | Gustafsson |
| 11,548,186 | B2 | 1/2023 | Timmons et al. |
| 2002/0096166 | A1 | 7/2002 | Halstead |
| 2003/0168054 | A1 | 9/2003 | Governo et al. |
| 2003/0196650 | A1 | 10/2003 | Bowman |
| 2005/0155594 | A1 | 7/2005 | Patzke et al. |
| 2006/0011191 | A1 | 1/2006 | Vavricek |
| 2006/0086350 | A1 | 4/2006 | Due |
| 2006/0240753 | A1 | 10/2006 | Ziegs |
| 2007/0109796 | A1 | 5/2007 | Johnson |
| 2007/0131211 | A1 | 6/2007 | Howard et al. |
| 2007/0163566 | A1 | 7/2007 | Johnson et al. |
| 2007/0194617 | A1 | 8/2007 | Moller et al. |
| 2007/0246583 | A1 | 10/2007 | Gorenflo |
| 2008/0116332 | A1 | 5/2008 | van der Meulen et al. |
| 2008/0233847 | A1 | 9/2008 | Von Siegroth et al. |
| 2009/0107476 | A1 | 4/2009 | Gobright, IV |
| 2010/0180453 | A1 | 7/2010 | Aronsson et al. |
| 2010/0251867 | A1 | 10/2010 | Shao et al. |
| 2011/0209692 | A1 | 9/2011 | Gobright, IV |
| 2011/0303060 | A1 | 12/2011 | Shima et al. |
| 2012/0068525 | A1 | 3/2012 | Moller |
| 2012/0174905 | A1 * | 7/2012 | Lee ........................ B23D 47/02 |
| | | | 125/12 |
| 2014/0102432 | A1 | 4/2014 | Edwards |
| 2015/0204415 | A1 | 7/2015 | Bateman et al. |
| 2016/0221222 | A1 | 8/2016 | Jenkins |
| 2018/0104851 | A1 | 4/2018 | Rieger |
| 2019/0030554 | A1 | 1/2019 | Mantes et al. |
| 2019/0078293 | A1 | 3/2019 | Gustafsson et al. |

(56) References Cited

U.S. PATENT DOCUMENTS

| | | | |
|---|---|---|---|
| 2019/0112783 | A1 | 4/2019 | Gustafsson et al. |
| 2019/0263015 | A1 | 8/2019 | Huber et al. |
| 2020/0023553 | A1* | 1/2020 | Timmons .................. B62B 3/12 |
| 2020/0231198 | A1* | 7/2020 | Uriegas ..................... B62B 3/10 |
| 2020/0276732 | A1 | 9/2020 | Merck et al. |
| 2020/0324437 | A1 | 10/2020 | Merck et al. |
| 2021/0198867 | A1 | 7/2021 | Gustafsson |
| 2023/0106037 | A1 | 4/2023 | Timmons et al. |

FOREIGN PATENT DOCUMENTS

| | | |
|---|---|---|
| CN | 107839076 A | 3/2018 |
| CN | 110370469 A | 10/2019 |
| CN | 211030706 U | 7/2020 |
| CN | 111593645 A | 8/2020 |
| CN | 212826168 U | 3/2021 |
| CN | 112720137 A | 4/2021 |
| CN | 213107519 U | 5/2021 |
| CN | 213687880 U | 7/2021 |
| DE | 1964605 U | 3/1967 |
| DE | 7040737 U | 5/1971 |
| DE | 8534802 U1 | 2/1986 |
| DE | 8709158 U1 | 8/1987 |
| DE | 9103718 U1 | 6/1991 |
| DE | 29506513 U1 | 7/1995 |
| DE | 102011108387 A1 | 1/2013 |
| DE | 202011110548 U1 | 9/2014 |
| EP | 0085304 A1 | 8/1983 |
| EP | 0925893 B1 | 4/2004 |
| WO | 9616229 A1 | 5/1996 |
| WO | 2010114545 A1 | 10/2010 |
| WO | 2016165899 A1 | 10/2016 |

\* cited by examiner

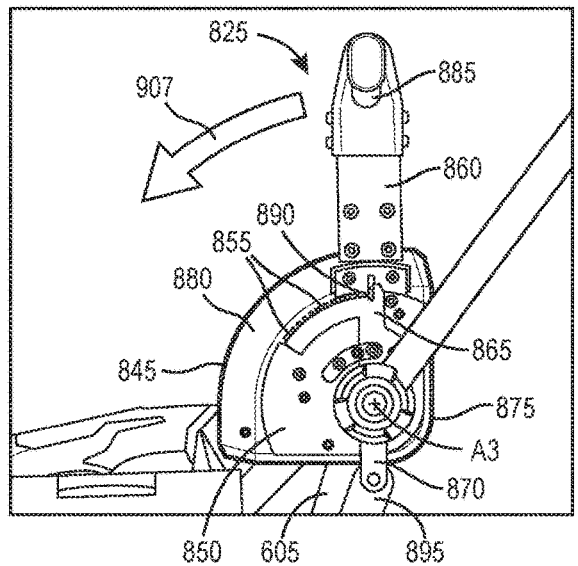
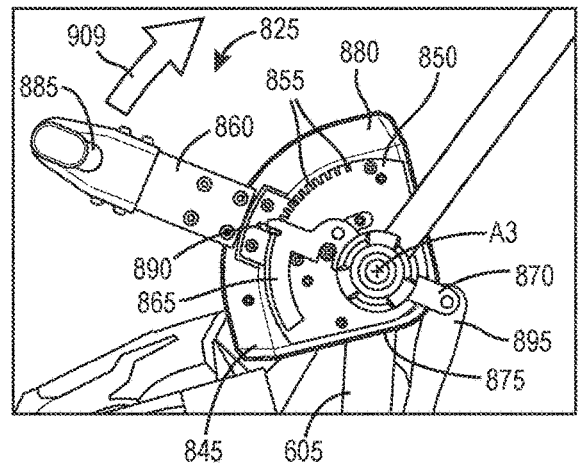
FIG. 14A    FIG. 14B
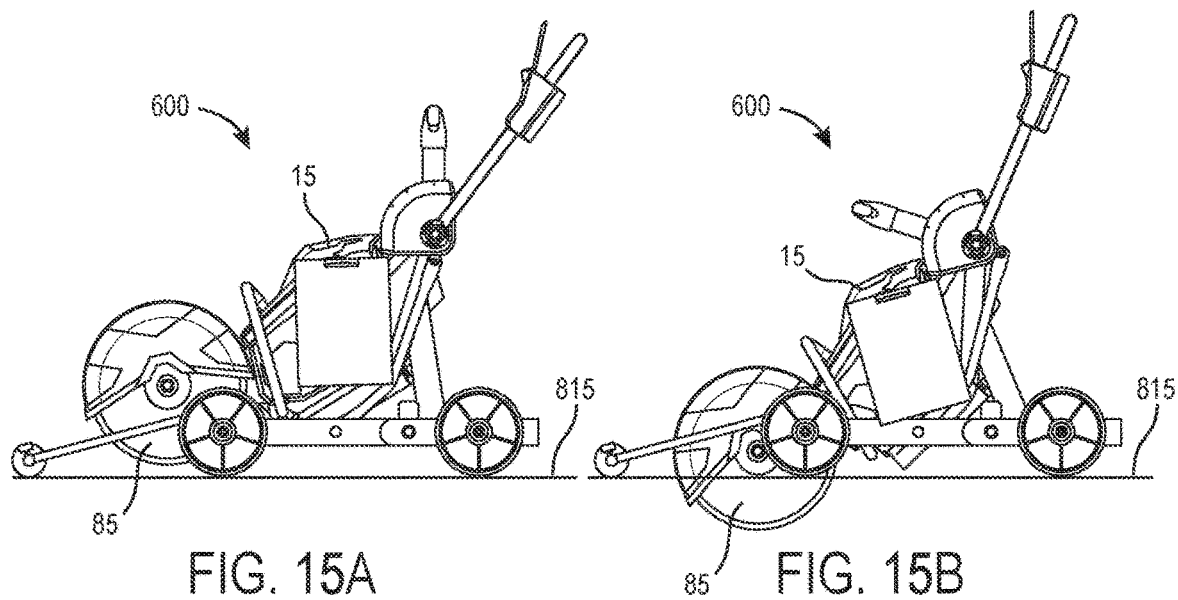
FIG. 15A    FIG. 15B

SAW CART

CROSS-REFERENCE TO RELATED APPLICATIONS

This application claims priority to U.S. Provisional Patent Application No. 63/481,862, filed on Jan. 27, 2023, and U.S. Provisional Patent Application No. 63/318,172, filed on Mar. 9, 2022, the entire contents of both of which are incorporated herein by reference.

FIELD OF THE INVENTION

The present invention relates to a cart, and more particularly to a cart for a cut-off saw.

BACKGROUND OF THE INVENTION

Power tools such as, for instance, cut-off saws, generally have many applications. Cut-off saws can be held directly by a user or supported by a cart. The cart allows the saw to make precise cuts into a floor surface such as concrete or asphalt. In order to do so, the cart needs to be able to support the saw and its associated equipment, adjust aspects of the saw, such as cutting depth, and control activation of the saw.

SUMMARY OF THE INVENTION

The invention provides, in one aspect, a cart for carrying a cut-off saw having a saw blade, a motor drivably coupled to the saw blade, a saw control unit configured to selectively activate the motor in response to a first input control signal from a trigger, and a first connector in communication with the saw control unit. The cart includes a remote actuation system having a cart control unit, a throttle configured to provide an input to the cart control unit, and a second connector configured to connect with the first connector of the cut-off saw. The cart also includes a wire interconnecting the cart control unit and the first connector. The wire configured to transmit a second input control signal from the cart control unit to the saw control unit upon receiving the input from the throttle, via the first and second connectors, to selectively activate and vary a rotational speed of the motor and the saw blade.

The invention provides, in another aspect, a cart for carrying a cut-off saw having a saw blade, a motor drivably coupled to the saw blade, a saw control unit configured to selectively activate the motor in response to a first input control signal from a trigger, and a first wireless communication device in communication with the saw control unit. The cart includes a remote actuation system having a cart control unit, a throttle configured to provide an input to the cart control unit, and a second wireless communication device in communication with the first wireless communication device. The second wireless communication device is configured to send a second input control signal to the first wireless communication device, upon receiving the input from the throttle, to selectively activate and vary a rotational speed of the motor and the saw blade.

The invention provides, in another aspect, a system including a cut-off saw having a saw blade, a motor drivably coupled to the saw blade, a saw control unit configured to selectively activate the motor in response to a first input control signal, and a first connector in communication with the saw control unit. The system also includes a cart for carrying the cut-off saw. The cart includes a remote actuation system having a cart control unit, a throttle configured to provide an input to the cart control unit, and a second connector configured to connect with the first connector of the cut-off saw. The cart control unit transmits a second input control signal to the saw control unit upon receiving the input from the throttle, via the first and second connectors, to selectively activate and vary a rotational speed of the motor and the saw blade.

The invention provides, in another aspect, a cart for carrying a cut-off saw having a saw blade. The cart includes a wheel arm having a first end, a second end opposite the first end, a wheel coupled to the first end. The cart also includes a rear wheel assembly coupled to the second end of the wheel arm. The rear wheel assembly defines a first axis. The cart also includes a frame pivotably coupled to the wheel arm about a second axis. The frame includes a lower portion and an upper portion. The cart further includes an adjustment lever pivotably coupled to the upper portion of the frame about a third axis and a link having a first end pivotably coupled to the adjustment lever at a location spaced from the third axis, and a second end pivotably coupled to the wheel arm. Pivoting the adjustment lever about the third axis pivots the frame about the second axis to adjust a vertical position of the frame relative to the wheel arm, and therefore a vertical position of the saw blade, relative to a support surface of the cart.

The invention provides, in another aspect, a cart for carrying a cut-off saw. The cart includes a frame and a saw retention system supported by the frame. The saw retention system is configured to support the saw on the cart. The saw retention system includes a front latch configured to engage a front portion of the saw and a rear latch assembly having a hook movable to engage a rear portion of the saw and a handle. The handle is pivotable about a pivot axis between a first position, in which the hook is disengaged from the rear portion of the saw, and a second position, in which the hook is engaged with the rear portion of the saw.

The invention provides, in another aspect, a cart for carrying a cut-off saw including a fluid distribution system. The cart includes a wheel arm having a first end, a second end opposite the first end, and a wheel coupled to the first end. The cart also includes a frame having a saw retention assembly configured to support the saw, a rear wheel assembly coupled to the second end of the wheel arm, and a blade wetting system configured to provide fluid to the fluid distribution system of the saw. The blade wetting system includes a tank and a mounting plate to support the tank. The mounting plate is pivotable relative the wheel arm.

The invention provides, in another aspect, a system including a cut-off saw including a saw blade and a motor drivably coupled to the saw blade, a cart having a mount to which the cut-off saw is attachable and a plurality of wheels to facilitate rolling the cart with the cut-off saw relative to a work surface, and a dust shroud mounted to one of the cut-off saw or the cart to substantially enclose the saw blade during a cutting operation.

Other aspects of the invention will become apparent by consideration of the detailed description and accompanying drawings.

BRIEF DESCRIPTION OF THE DRAWINGS

FIG. 14A is a side view of the cart of FIG. 1 illustrating an adjustment lever of the depth adjustment assembly in a first position.

FIG. 14B is a side view of the cart of FIG. 1 illustrating the adjustment lever of the depth adjustment assembly in a second position.

FIG. 15A is a side view of the cart of FIG. 1 illustrating the depth adjustment assembly in the first position.

FIG. 15B is a side view of the cart of FIG. 1 illustrating the depth adjustment assembly in the second position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
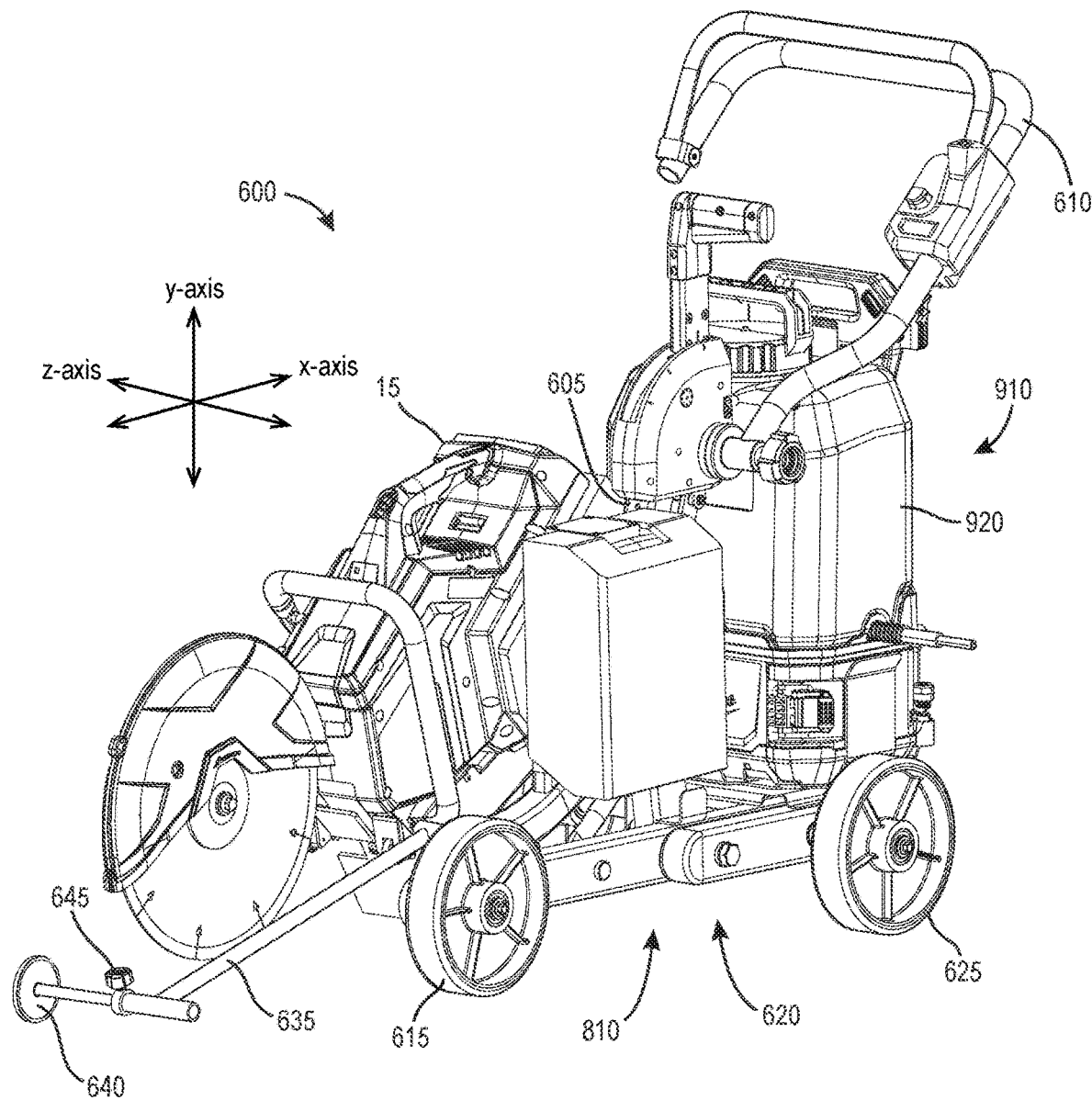
FIG. 1 is a front perspective view of a cart, in accordance with an embodiment of the invention, supporting a cut-off saw.
Figure 2:
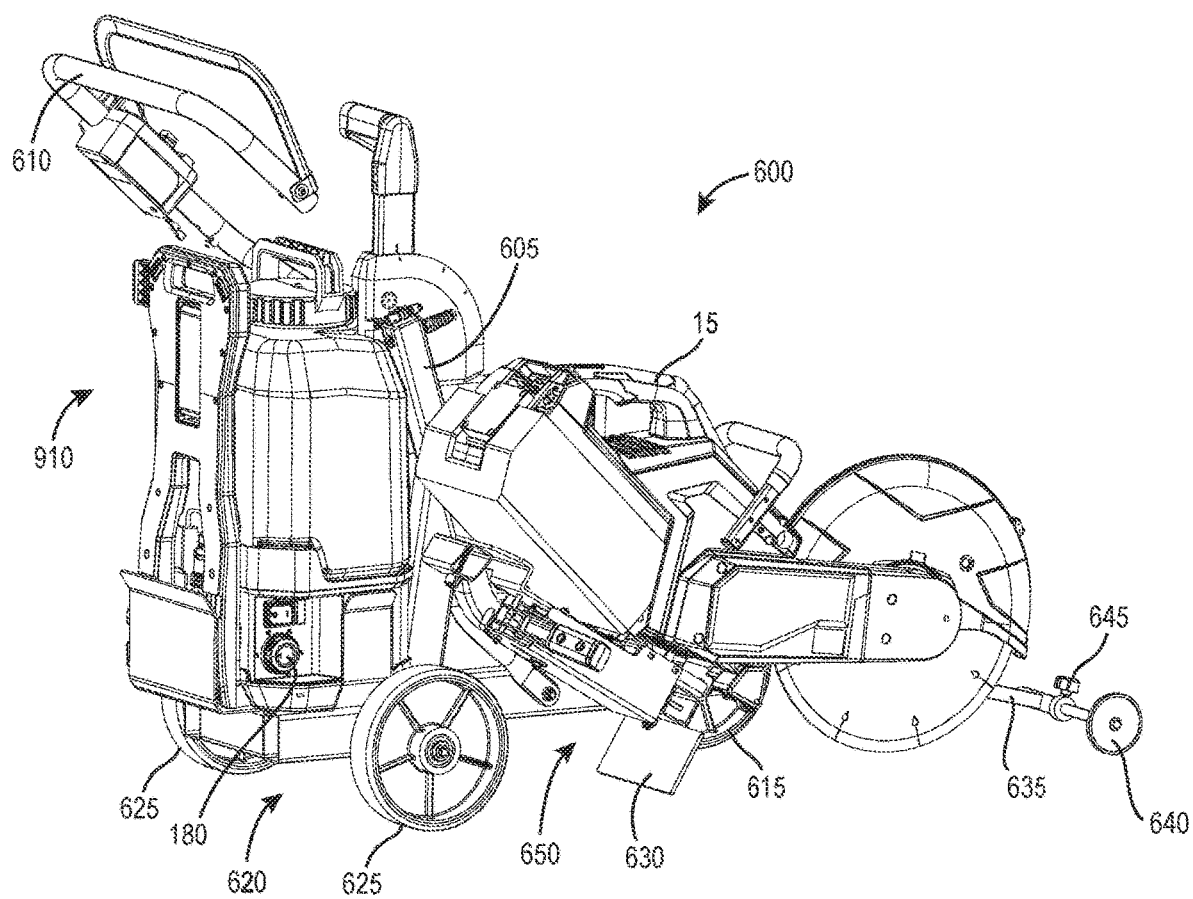
FIG. 2 is a rear perspective of the cart of FIG. 1.

FIGS. 1 and 2 illustrates a cart 600 for supporting a power tool, such as a cut-off saw 15. The cart 600 is capable of conveying the saw 15 over surfaces during operation and for transport. The cart 600 is able to transport the saw 15 in a transport direction, along the x-axis shown in FIG. 1, in either a forward or backwards direction.

Figure 3:
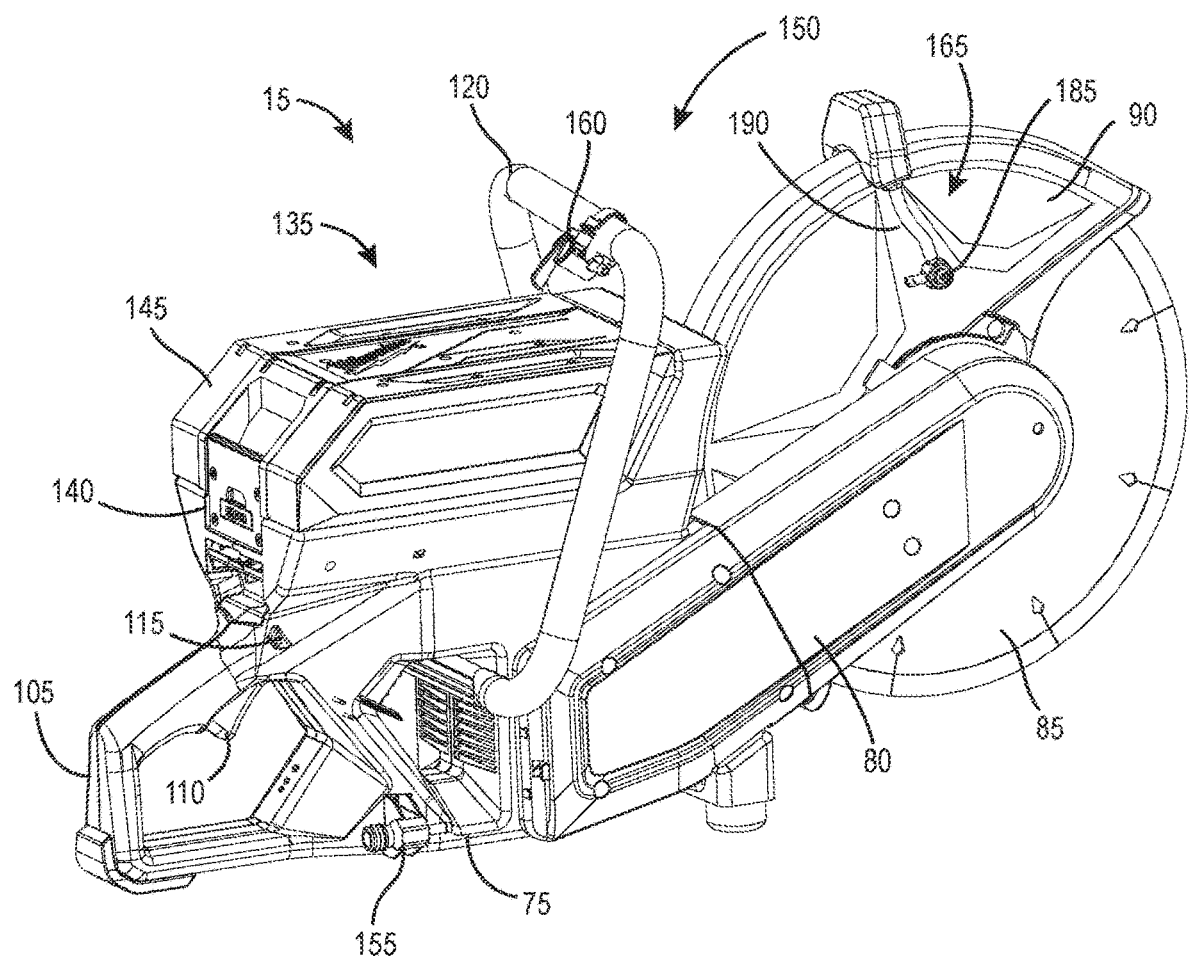
FIG. 3 is a perspective view of the cut-off saw of FIG. 1.

With reference to FIG. 3, the saw 15 includes a housing 75, a support arm 80 coupled to and extending from the housing 75, a cutting wheel 85 carried by the support arm 80, and a guard 90 covering a portion of the circumference of the cutting wheel 85. The cutting wheel 85 can be a blade, an abrasive disk, or any other rotatable element capable of removing material from a workpiece. In the illustrated embodiment, the cutting wheel 85 has a diameter greater than 9 inches and is preferably 14 inches in diameter. In other embodiments, the cutting wheel 85 can be between about 10 inches and about 16 inches in diameter.

The saw 15 includes a rear handle 105 that extends from the rear of the housing 75 in a direction generally opposite the support arm 80. A trigger 110 for operating the saw 15 and a lockout shuttle 115 that prevents the user from pulling the trigger 110 unless it is first depressed are both located on the rear handle 105. The saw 15 also includes a front handle 120 that wraps around an upper portion of the housing 75 and that in conjunction with the rear handle 105, provides grip areas to facilitate two-handed operation of the saw 15.

The saw 15 includes an on-board battery pack 135 that provides power to an electric motor (not shown). The battery pack 135 is removably coupled to a battery receptacle 140, which is located on the upper portion of the housing 75. As such, the front handle 120 at least partially surrounds the battery receptacle 140 and the battery pack 135, when the battery pack 135 is attached to the receptacle 140. The battery pack 135 is a power tool battery pack and includes a battery housing 145 and a plurality of rechargeable battery cells (not shown) disposed within the battery housing 145. The battery cells are lithium-based battery cells but can alternatively have any other suitable chemistry. In the illustrated embodiment, the battery pack 135 has a nominal output voltage of about 80V. In other embodiments, the battery pack 135 can have a different nominal voltage, such as, for example, 36V, 40V, 72V, between 36V and about 80V, or greater than 40V. In an alternative embodiment, the battery receptacle 140 may be incorporated on the cart 600, instead of the saw 15, to provide electrical power to the motor of the saw 15.

With continued reference to FIG. 3, the saw 15 further includes a fluid distribution system 150. The fluid distribution system 150 includes a connector 155 attachable to a fluid supply line (not shown), a control valve 160 supported upon the front handle 120, and a distributor 165 supported upon the guard 90. A supply line provides fluid, such as water, to the fluid distribution system 150 from an external source. In the illustrated embodiment, the external source is a water tank 920 (FIG. 1) carried onboard the cart 600. The water tank 920 includes a connector 180 (FIG. 2), which may include an integrated shutoff valve, to which the supply line is connected. A first line (not shown) extends from the connector 155 to the control valve 160, and a second line (not shown) extends from the control valve 160 to the distributor 165. In the illustrated embodiment, the distributor 165 includes a pair of spray nozzles 185 disposed on opposite sides of the guard 90 connected by a supply line 190. The spray nozzles 185 are operable to discharge fluid onto each side of the cutting wheel 85 for cooling, lubrication, and dust abatement.

With reference back to FIGS. 1 and 2, the cart 600 is configured to support a power tool, such as the cut-off saw 15 discussed above. The cart 600 includes a frame 605 to which the saw 15 is attachable, a handle 610 upwardly extending from the frame 605 that is graspable by a user for maneuvering the cart 600, a front wheel 615, and a rear wheel assembly 620 having two rear wheels 625. The frame 605 includes a material discharge guard (e.g., flap 630) that blocks material cut by the saw 15 from contacting a user of the cart 600. The cart 600 also includes a guide arm 635 to guide the cutting direction of the saw 15. The guide arm 635 is coupled to the frame 605 and extends in front of the saw 15 and cart 600. The guide arm 635 includes a guide wheel 640 that may be moved laterally relative to the cutting wheel 85 in a direction of the z-axis (FIG. 1) by loosening a knob 645 to adjust the travel path of the cutting wheel 85 and cart 600.

Figure 4:
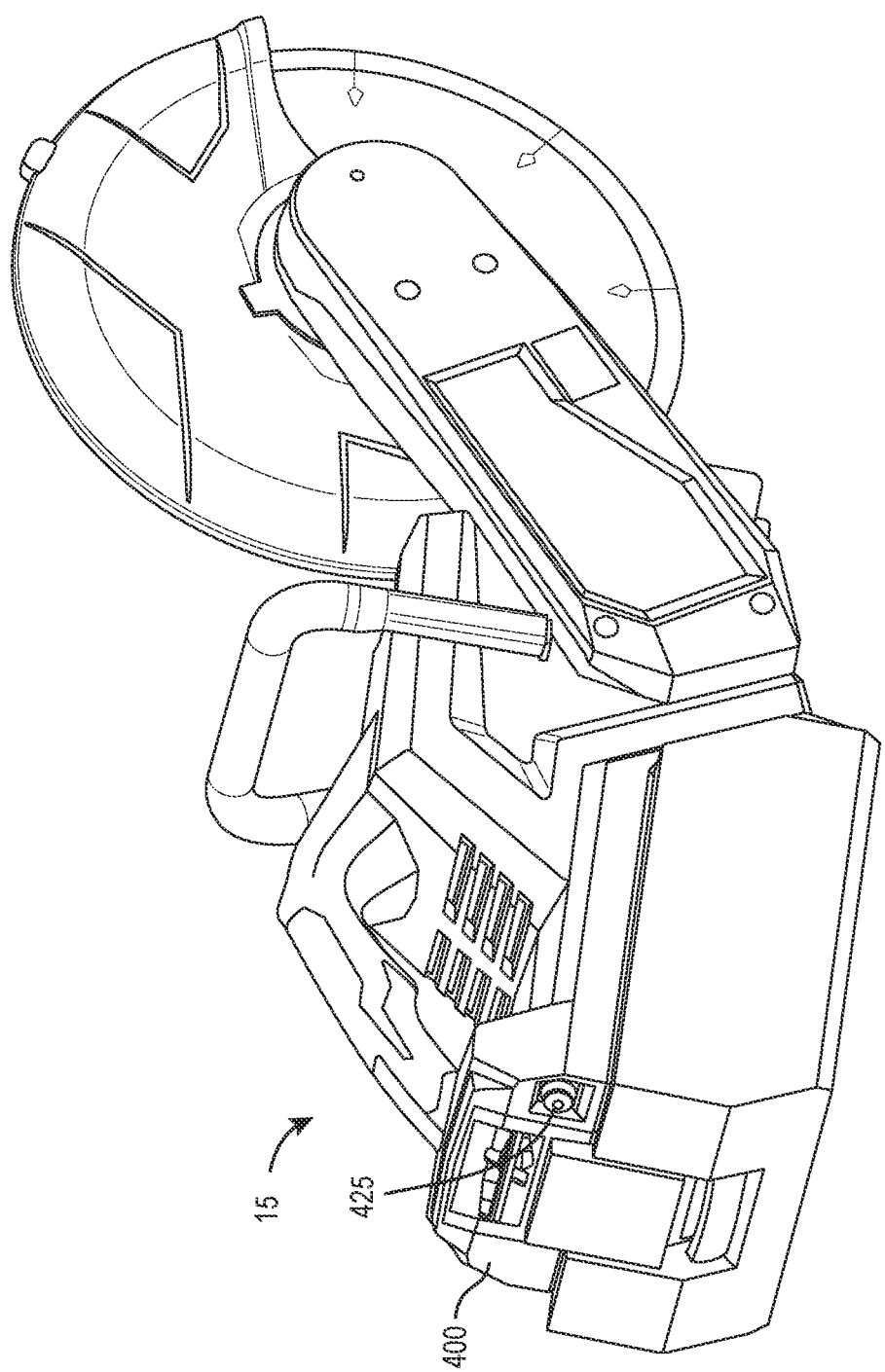
FIG. 4 is a rear perspective view of a cut-off saw for use with the cart of FIG. 1, illustrating a connector on the cut-off saw that interfaces with a remote actuation system of the cart of FIG. 1.
Figure 4B:
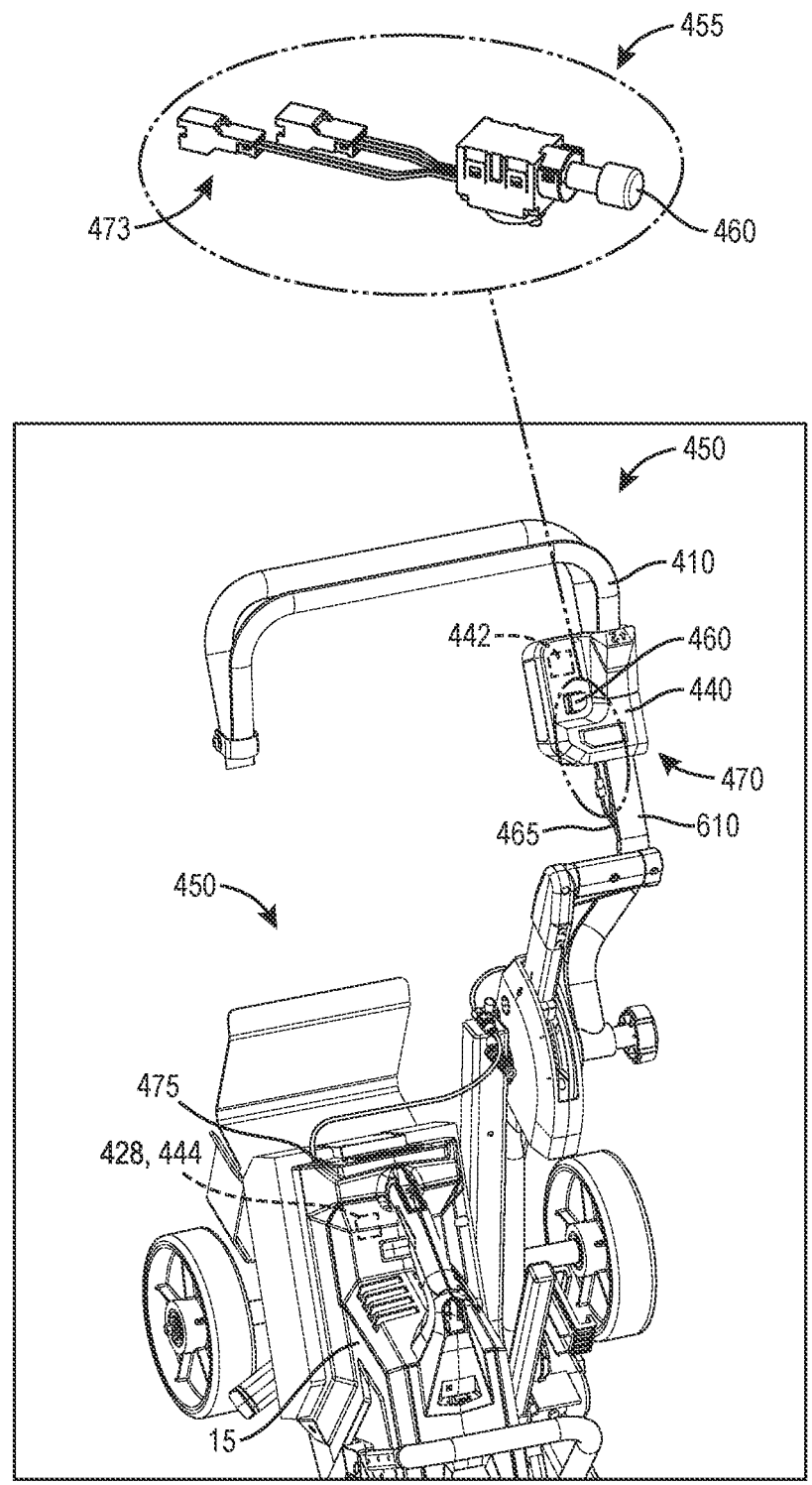
FIG. 4B is a perspective view of the cart of FIG. 1 illustrating the remote actuating system in more detail.

With reference to FIGS. 4 and 4B, the cart 600 includes a remote actuation system 450 for activating and deactivating the saw 15 when it is supported on the frame 605. The remote actuation system 450 interfaces with an electrical connector 425 (FIG. 4) on the saw 15 to provide an input control signal to a saw control unit 428 onboard the saw 15 which, in turn, can activate and deactivate the saw 15. The remote actuation system 450 includes a cart mating electrical connector 473 configured to mechanically and electrically connect to the connector 425 on the saw 15. In the illustrated embodiment, the connector 425 is provided on a rear end 400 of the saw 15, and the control unit 440 is provided on an upper portion of the handle 610 of the cart 600. In other embodiments, the cart control unit 440 may be provided on other parts of the cart 600, such as the frame 605. A rubber plug (not shown) may be provided and inserted into the connector 425 when it is not in use.

The remote actuation system 450 further includes a throttle lever 410 pivotably coupled to the handle 610 and in communication with the control unit 440 to provide an input to the cart control unit 440. In the illustrated embodiment, the remote actuation system 450 includes a lockout system including a lockout actuator 455 coupled to the handle 610 and in communication with the control unit 440. In the illustrated embodiment, the actuator 455 is a push-button switch including a depressible button 460 that extends out of the control unit 440 and accessible to a user. The lockout actuator 455 is moveable between a first position and a second position. The control unit 440 is operable in an idle mode when the lockout actuator 455 is in the first position and an active mode when the lockout actuator 455 is in the second position. While in the active mode, pivoting of the throttle lever 410 prompts the control unit 440 to output an input control signal to the saw 15 to activate the motor, causing the cutting wheel 85 of the saw 15 to rotate. In some embodiments, the rotational speed of the motor varies with dependence on the degree to which the throttle lever 410 is pivoted, such that the motor will operate at its maximum rotational speed when the throttle lever 410 is maximally pivoted. While in the idle mode, pivoting of the throttle lever 410 does not prompt the control unit 440 to output an input control signal to the saw 15, and thus pivoting movement of the throttle lever 410 will not activate the motor.

A wire 465 electrically couples the cart control unit 440 and the actuator 455 to the saw 15. Specifically, a first end 470 of the wire 465 connects to the pin connector 473 (e.g., male connection) on the actuator 455 and a second end 475 couples to the connector 425 (e.g., female connection) on the saw 15. In the illustrated embodiment, the wire 465 is routed through a portion of the handle 610 and into the control unit 440. As described above, when the button 460 is depressed, the control unit 440 sends a signal to the saw 15 to activate in the idle mode. Then, pivoting the throttle lever 410 prompts the control unit 440 to output an input control signal to the saw 15 to activate the motor, causing the cutting wheel 85 of the saw 15 to rotate.

In other embodiments, the control unit 440 may include a wireless communication device 442 (FIG. 6B) that sends a signal to a wireless communication device 444 (FIG. 6B) on the saw 15. The wireless communication device 442 is configured to send a signal (e.g., a control signal) to the wireless communication device 444 on the saw 15 when the throttle lever 410 is pivoted to the wireless communication device 444 on the saw 15. In operation, when the throttle lever 410 is pivoted, the throttle lever 410 sends an input control signal to the cart control unit 440. The cart control unit 440 then sends an input to the wireless communication device 444 on the saw 15 via the wireless communication device 442 on the cart 600. The wireless communication device 444 of the saw 15 then sends an input control signal to selectively activate and vary rotational speed of the motor and the cutting wheel 85.

Figure 5:
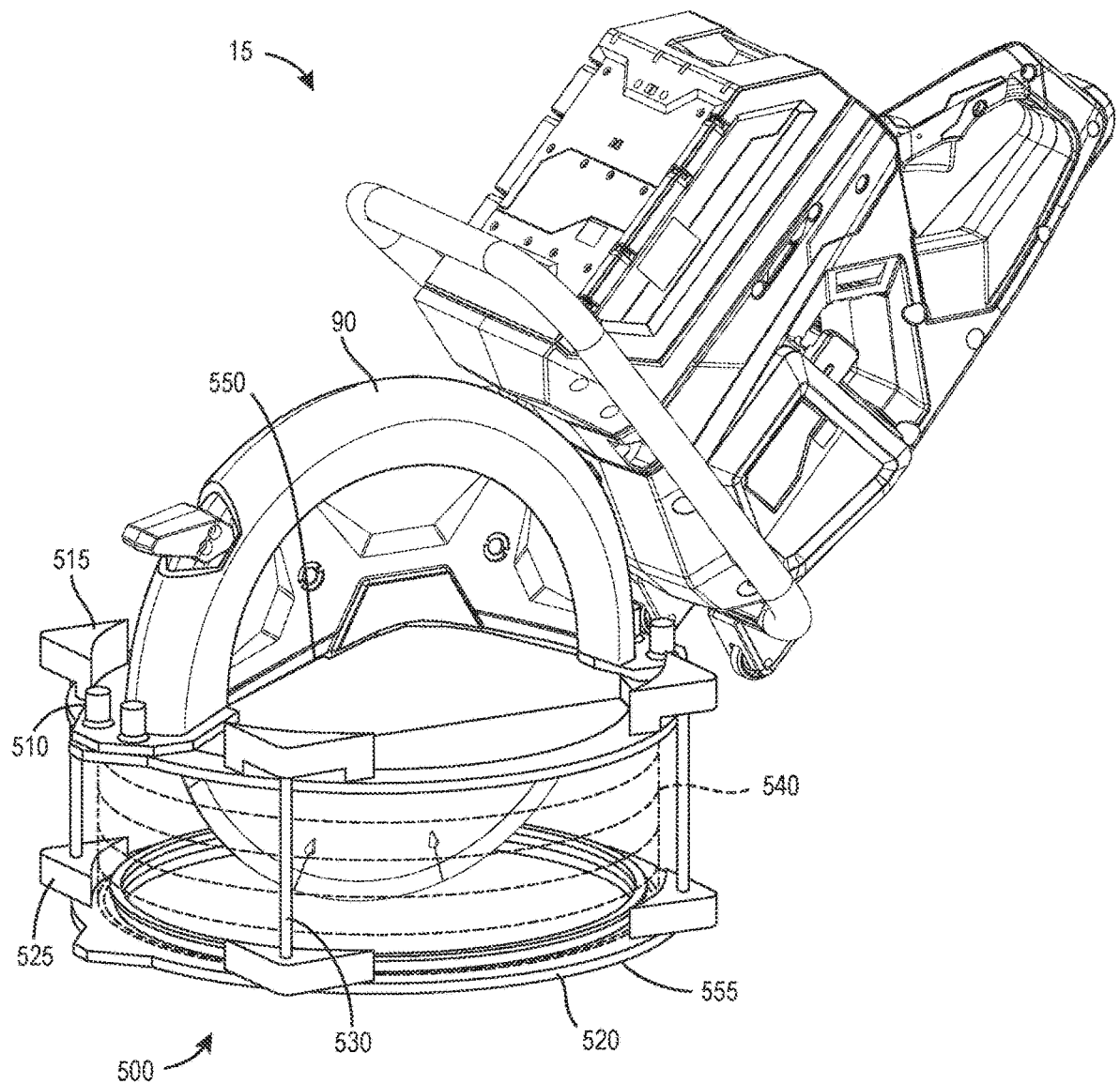
FIG. 5 is a perspective view of a dust shroud, in accordance with an embodiment of the invention, for use with the cut-off saw of FIG. 1.
Figure 6:
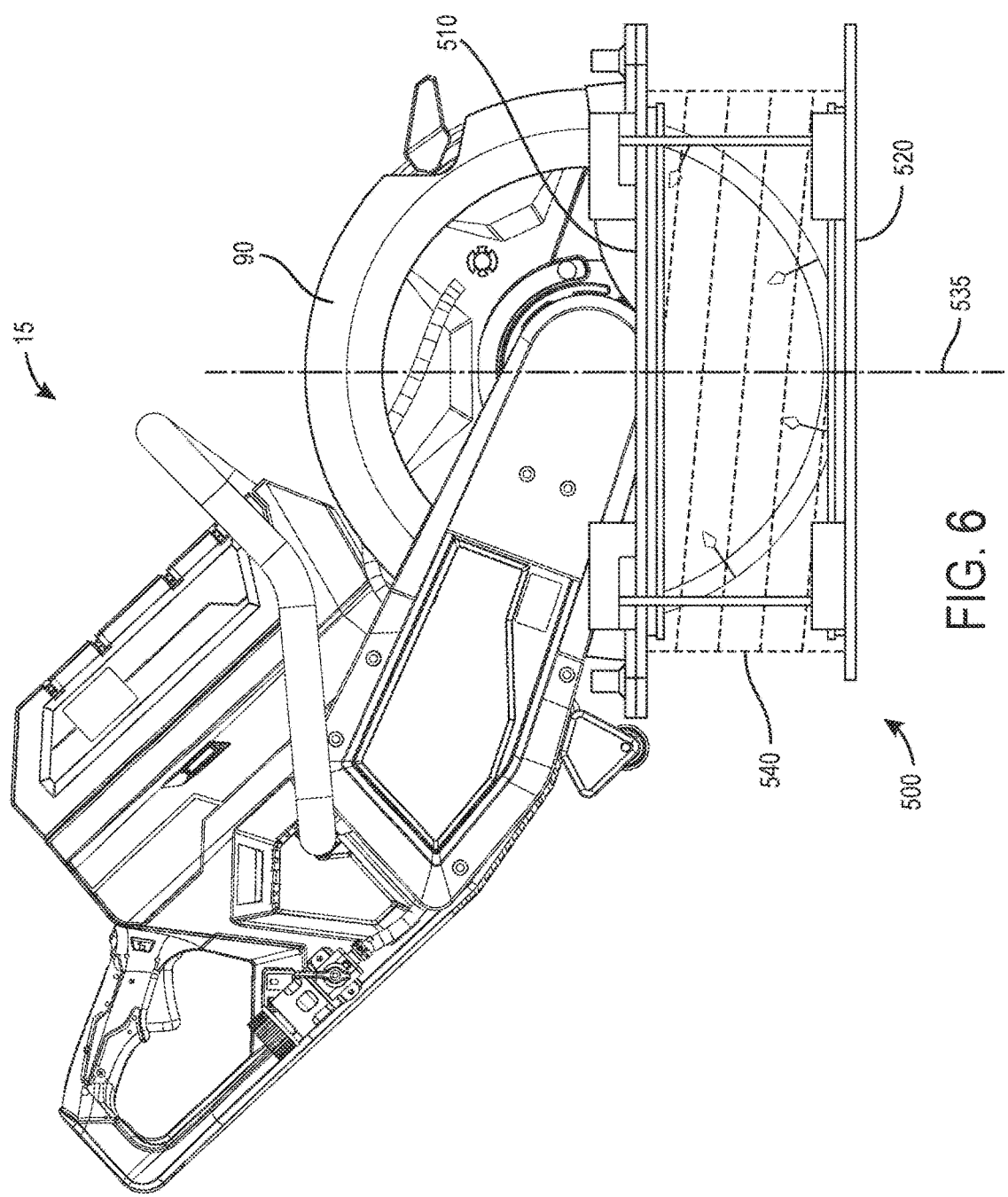
FIG. 6 is a side view of a dust shroud, in accordance with another embodiment of the invention, for use with the cut-off saw of FIG. 1.

In some embodiments, as shown in FIG. 5 and FIG. 6, a dust shroud 500 may be included as an accessory mounted to either the cart 600 or the guard 90 of the saw 15. In the illustrated embodiment, the dust shroud 500 includes an upper annular plate 510, a lower annular plate 520, and a plurality of mounting rods 530 extending between corresponding flanges 515, 525 on the plates 510, 520. The rods 530 ensure that the first annular plate 510 and the second annular plate 520 are substantially parallel and share a common central axis 535, and that the lower annular plate 520 is coaxially movable along the common central axis 535 relative to the upper annular plate 510 to expose the cutting wheel 85 during a cutting operation. The upper annular plate 510 is configured to mount the dust shroud 500 to the guard 90. A tight seal 550, such as a foam seal or gasket material, may be provided between the upper annular plate 510 and the guard 90 to prevent dust or other material from escaping between the upper annular plate 510 and the guard 90. The lower annular plate 520 is configured to engage a floor, such as concrete. A weak seal 555 may be provided between the lower annular plate 520 and the floor, such that dust or other material is restricted from escaping between the lower annular plate 520 and the floor, but still permitting the lower annular plate 520 to slide along the floor.

The dust shroud 500 further includes a flexible shroud or duct 540 disposed between the upper annular plate 510 and the lower annular plate 520 to substantially enclose the cutting wheel 85 during a cutting operation. Portions of the duct 540 may be transparent to provide a line of sight to the cutting wheel 85. Alternatively, a cutout may be provided in the duct 540 to provide a line of sight to the cutting wheel 85. Water may be routed through the duct 540 and directed inside the guard 90, via nozzles (not shown) coupled to the duct 540, to provide dust abatement. The water may be provided to the dust shroud 500 via a water hose connected to both the dust shroud 500 and the water tank 920 of the cart 600 or a separate water tank, which may be configured as a gravity feed tank.

Figure 7:
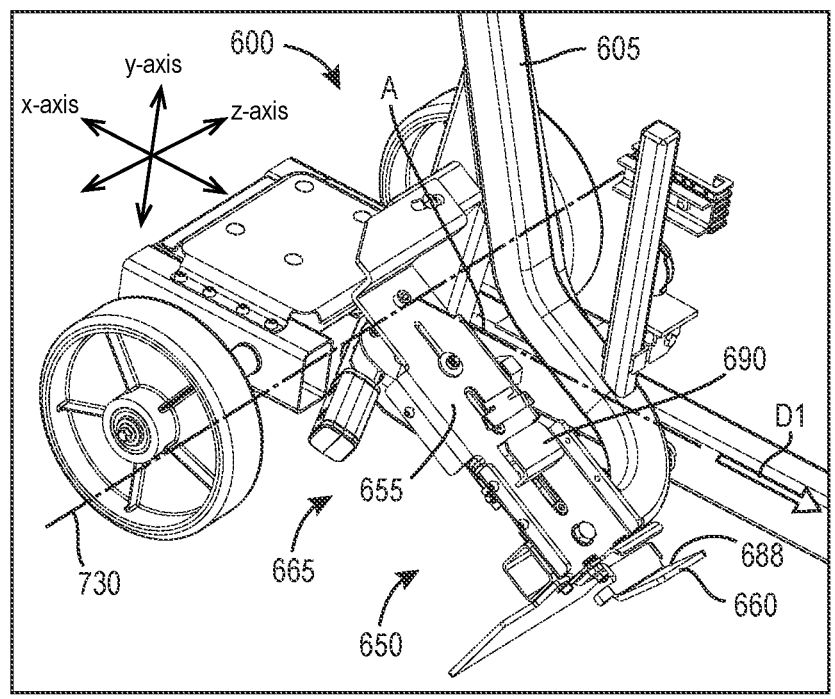
FIG. 7 is a perspective view of the cart of FIG. 1 with the cut-off saw removed illustrating a saw retention assembly.
Figure 12:
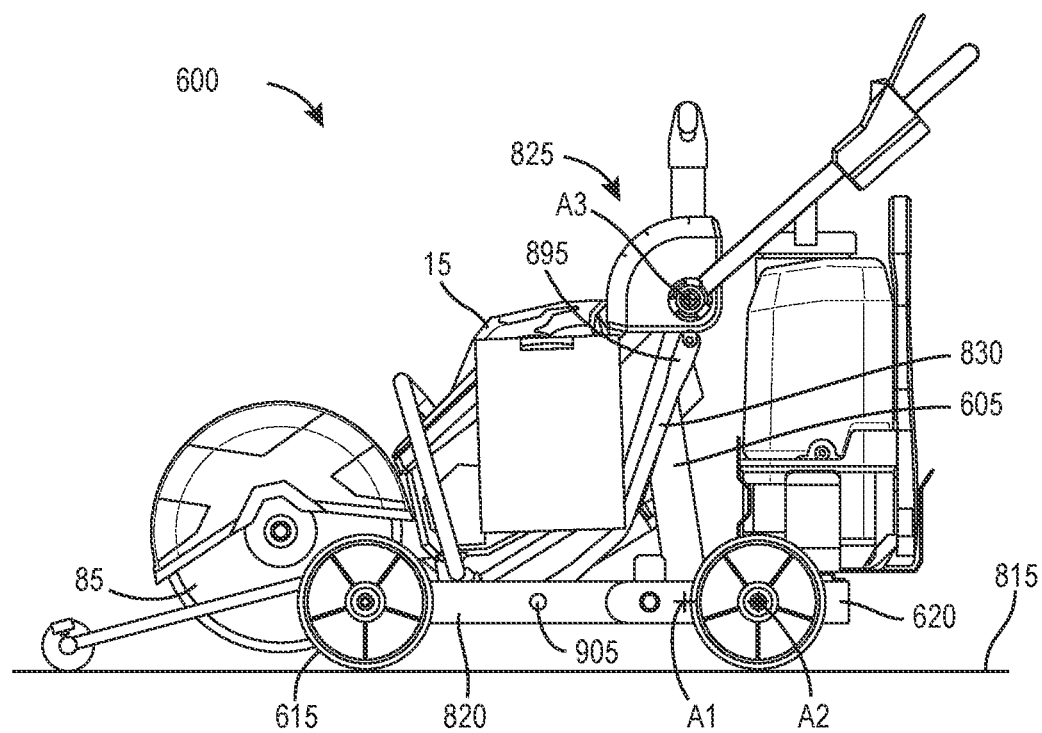
FIG. 12 is another side view of the cart of FIG. 1 illustrating a depth adjustment assembly.

With reference to FIG. 7, the cart 600 includes a saw retention assembly 650 to secure the saw 15 to the frame 605. The saw retention assembly 650 includes a support bracket 655 extending from a lower portion of the frame 605, a front latch 660, and a rear latch assembly 665. With reference to FIG. 12, the saw 15 further includes a ball handle 670 at a forward end and a hook cavity 675 at a rearward end. The ball handle 670 defines a support surface 680 positioned between two wheels 685 on the saw 15. The front latch 660 is fixed to the support bracket 655 and includes a support surface 688 that corresponds to the support surface 680 on the saw 15.

Figure 8:
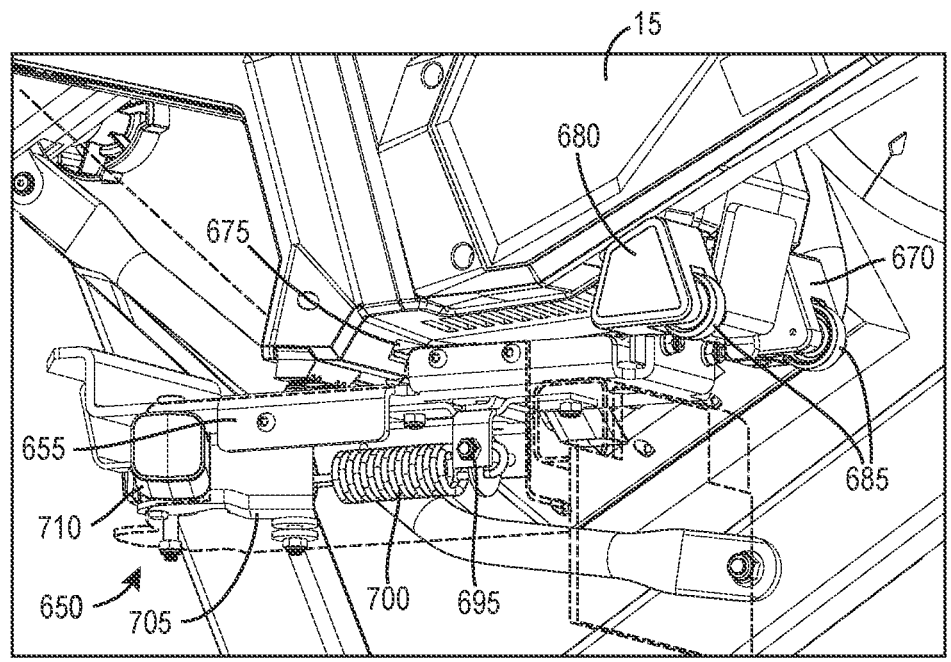
FIG. 8 is a detailed view of the saw retention assembly coupling to the cut-off saw.
Figure 9:
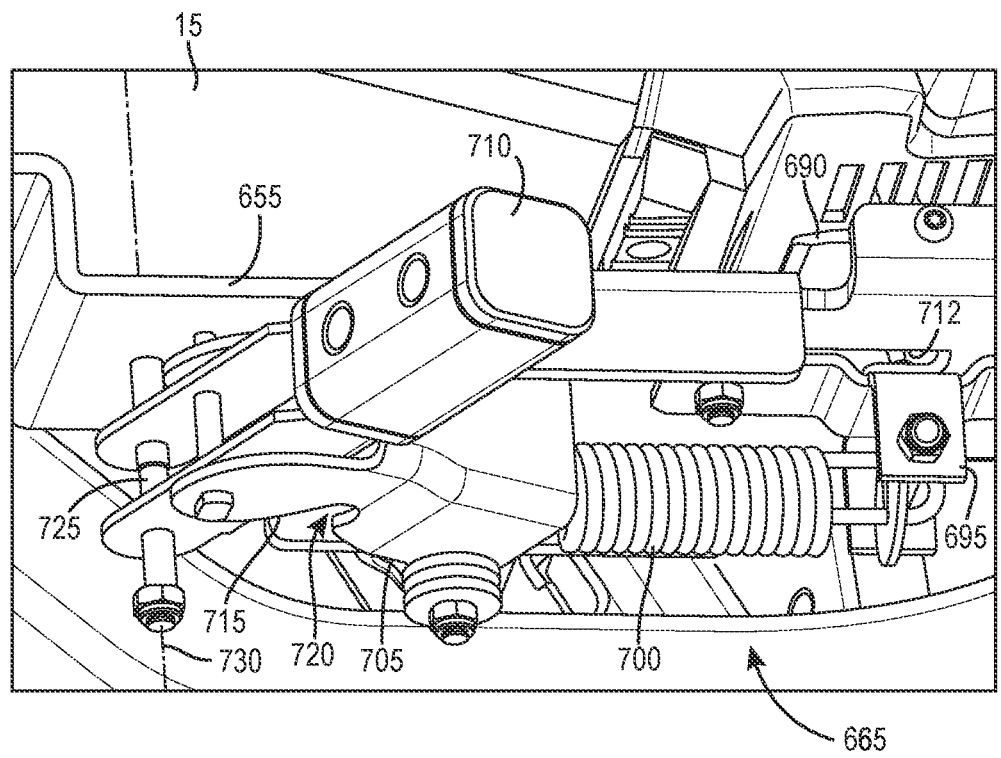
FIG. 9 is another detailed view of the saw retention assembly.

With reference to FIGS. 8 and 9, the rear latch assembly 665 includes a hook 690, a hook plate 695, a biasing member (e.g., a tension spring 700), a handle support 705, and a handle 710. The hook 690 extends from the hook plate 695 through an opening 712 on the support bracket 655. The hook 690 is moveable to engage the hook cavity 675 of the saw 15 to secure the saw 15 to the cart 600. The spring 700 is coupled at one end to the hook plate 695 and coupled to the handle support 705 at the other end. The handle support 705 is rotatably coupled to the support bracket 655 at one end and coupled to the handle 710 at the other end. The handle support 705 also includes a cam portion 715 defining a recess 720. The handle 710 is pivotably coupled to the support bracket 655 with a fastener 725 (e.g., pin, bolt, screw, etc.) that defines a pivot axis 730. The pivot axis 730 extends in a direction along a plane defined by the x-axis and the y-axis. In other words, the pivot axis 730 is transverse to both the y-axis and the x-axis. Further, the pivot axis 730 is at an oblique angle A (FIG. 7) relative to the travel direction D1 of the cart 600 and a direction perpendicular to the travel direction D1. The handle 710 is pivotable about the pivot axis 730 between a first position, in which the saw 15 is removably supported on the cart 600, and a second position, in which the saw 15 is secured or locked on the cart 600.

Figure 10:
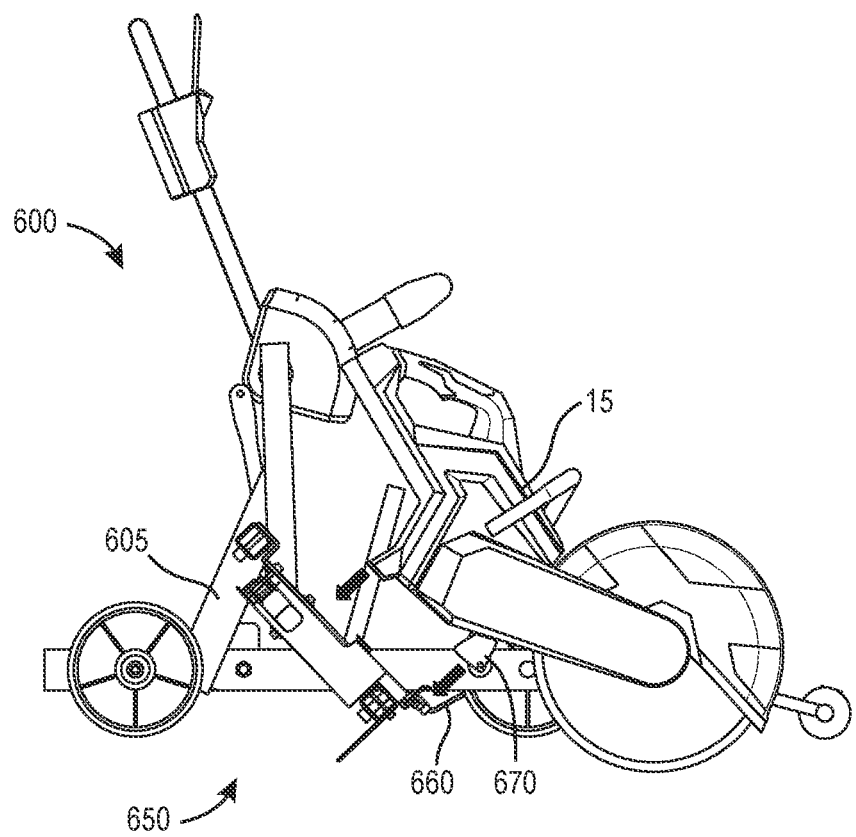
FIG. 10 is a side view of the cart of FIG. 1 with the cut-off saw attaching to the saw retention assembly.
Figure 11:
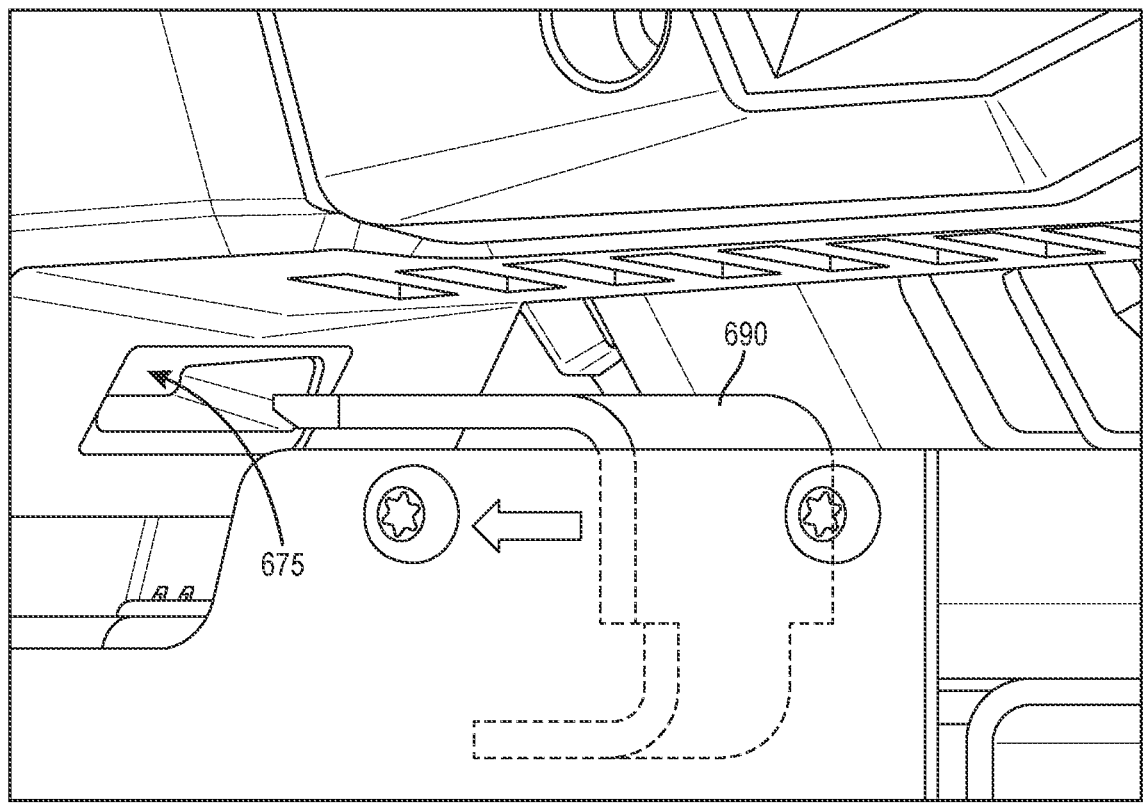
FIG. 11 is another detailed view of the saw retention assembly coupling to the cut-off saw.

To secure the saw 15 on the cart 600, a user lowers the saw 15 onto the support bracket 655 aligning the front latch 660 between two wheels 685 of the ball handle 670 on the cart 600 to position the support surface 680 on the saw 15 on the support surface 688 of the front latch 660 (FIG. 10). The user then lowers the back end of the saw 15 towards the support bracket 655 to rest the back end of the saw 15 on the support bracket 655. In this position, the hook 690 has not yet engaged the hook cavity 675. A user can then pivot the handle 710 about the pivot axis 730 from the first position towards the second position. As the handle 710 is pivoted, the handle support 705, the spring 700, the hook plate 695, and the hook 690 begin to move linearly rearwards towards the hook cavity 675 (FIG. 11). Movement of the handle support 705, spring 700, the hook plate 695, and the hook 690 continues until the hook 690 engages the hook cavity 675. Once the hook 690 engages the hook cavity 675, movement of the hook 690 and the hook plate 695 is ceased. However, due to the handle 710 not being in the second position yet, movement of the handle support 705 and the spring 700 continues creating tension in the spring 700. As the handle 710 approaches the second position, the pivoting of the handle 710 draws the cam portion 715 towards the fastener 725 until the fastener 725 is received in the recess 720 and the handle 710 is in the second position. While the handle 710 is in the second position, the tension in the spring 700 is sufficient to keep the hook 690 engaged with the hook cavity 675, securing the saw 15 on the cart 600. Additionally, as the handle 710 is moved into the second position, a center axis of the spring 700 passes over the fastener 725. As such, the spring 700 biases the handle 710 into the locked position. To remove the saw 15 from the cart 600, a user may move the handle 710 from the second position to the first position, allowing the hook 690 to move away from and disengage the hook cavity 675. A user may then lift the saw 15 away from the cart 600.

Figure 13:
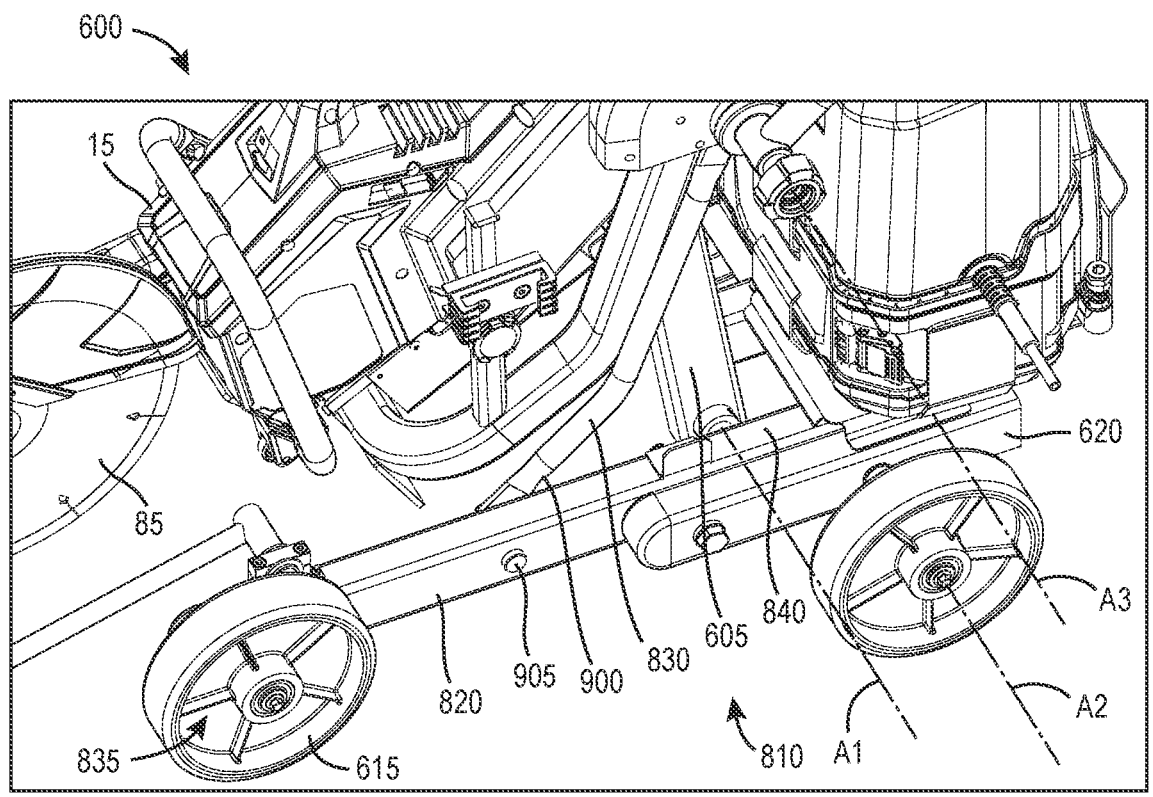
FIG. 13 is a perspective view of the cart of FIG. 1 with portions removed.

With reference to FIGS. 12 and 13, the cart 600 further includes a depth adjustment assembly 810 for varying the plunge depth of the cutting wheel 85 into a support surface 815 of the cart 600. The depth adjustment assembly 810 includes a wheel arm 820, an adjustment lever 825, and a link 830 interconnecting the wheel arm 820 and the adjustment lever 825. The wheel arm 820 includes a first end 835 and a second end 840 opposite the first end 835. The front wheel 615 is rotatably coupled to the first end 835 of the wheel arm 820 and the second end 840 of the wheel arm 820 supports the rear wheel assembly 620. The wheel arm 820 is pivotably coupled to the frame 605 about an axis A1. The axis A1 is positioned between the first end 835 and the second end 840 of the wheel arm 820 and is also positioned in front of a rotational axis A2 of the rear wheels 625. As such, the frame 605 is rotatable about the axis A1 relative to the wheel arm 820, allowing the wheel arm 820 to maintain the front wheel 615 on the support surface 815 while adjusting the plunge depth of the cutting wheel 85.

With reference to FIGS. 14A and 14B, the adjustment lever 825 includes a housing 845 attached to an upper portion of the frame 605 and a lock plate 850, which has gear teeth 855 on an arcuate outer periphery, affixed to the housing 845. Accordingly, the orientation of the housing 845 and the lock plate 850 is fixed relative to the frame 605. The adjustment lever 825 is pivotably coupled to the frame 605 about an axis A3 (also shown in FIG. 13) that is parallel with the axes A1, A2. The adjustment lever 825 includes a handle 860 coupled to a support bracket 865 adjacent the lock plate 850. A lower end 870 of the support bracket 865 extends from a lower opening 875 in the housing 845. The handle 860 extends from an upper opening 880 in the housing 845 having an arc length corresponding to the arc length of the portion of the lock plate 850 having the gear teeth 855.

With continued reference to FIGS. 14A and 14B, the adjustment lever 825 includes an actuator 885 (i.e., squeeze trigger) protruding from the handle 860 and a pin 890 coupled to the actuator 885 that engages the gear teeth 855 on the lock plate 850. The adjustment lever 825 also includes a resilient member (e.g., a compression spring, not shown) that biases the pin 890 to a position in which the pin 890 is engaged with the gear teeth 855. When a user squeezes the actuator 885 on the handle 860, the pin 890 is lifted out of engagement with the gear teeth 855, allowing the adjustment lever 825 to pivot about the axis A3 relative to the housing 845. Although not shown, the housing 845 may include depth adjustment markings thereon for the user to reference when adjusting the position of the handle 860. The link 830 includes a first end 895 that is pivotably coupled to the lower end 870 of the support bracket 865 and a second end 900 (FIG. 13) that is pivotably coupled to the wheel arm 820 via a pin 905 positioned between the first and second ends 835, 840 of the wheel arm 820.

The depth adjustment assembly 810 adjusts the vertical position of the frame 605 relative to the wheel arm 820. In other words, the depth adjustment assembly 810 adjusts the vertical position of the cutting wheel 85, when the saw 15 is attached to the cart 600, relative to the support surface 815 of the cart 600 to vary the plunge depth of the cutting wheel 85 into the support surface 815. The depth adjustment assembly 810 moves the saw 15 between a first position (FIGS. 14A and 15A), in which the cutting wheel 85 is above the support surface 815 to facilitate transporting the cart 600 and the saw 15, and a second position (FIGS. 14B and 15B), in which the cutting wheel 85 is at a maximum plunge depth into the support surface 815 during operation.

To adjust the plunge depth of the cutting wheel 85, a user squeezes the actuator 885, which lifts the pin 890 out of engagement with the gear teeth 855 on the lock plate 850, allowing the adjustment lever 825 to rotate about the axis A3. As the adjustment lever 825 rotates, the frame 605 is allowed to pivot about the axis A1 in a downward direction by the link 830, changing the position of the frame 605 relative to the wheel arm 820, and thus the position of the cutting wheel 85 relative to the support surface 815. If the adjustment lever 825 is rotated forward, as indicated by arrow 907 (FIG. 14A), the frame 605 is pivoted downwards relative to the wheel arm 820, dropping the cutting wheel 85 further into the support surface 815 (and increasing the plunge depth of the cutting wheel 85). Alternatively, if the adjustment lever 825 is rotated backwards as indicated by arrow 909 (FIG. 14B), the frame 605 is pivoted upwards relative to the wheel arm 820, raising the cutting wheel 85 away from the support surface 815 (and decreasing the plunge depth of the cutting wheel 85). Due to the frame 605 rotating relative to the wheel arm 820, the angular position of the adjustment lever 825 directly correlates to the angular position of the frame 605 relative to the wheel arm 820, enhancing a user's ability to guide the cutting wheel 85 to the appropriate plunge depth.

Figure 16:
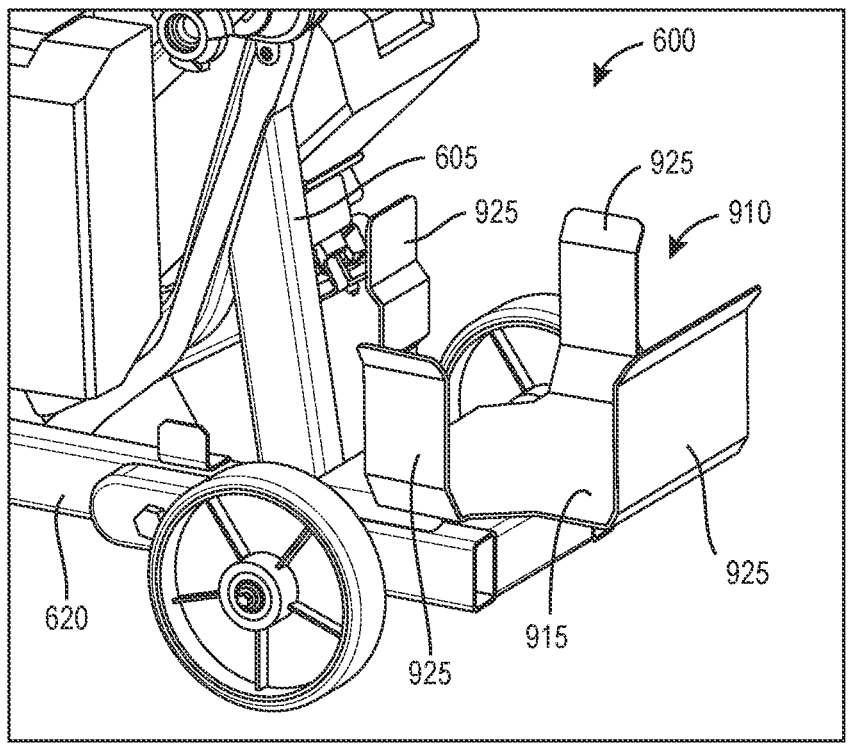
FIG. 16 is a rear perspective view of the cart of FIG. 1 with a water tank removed.
Figure 17:
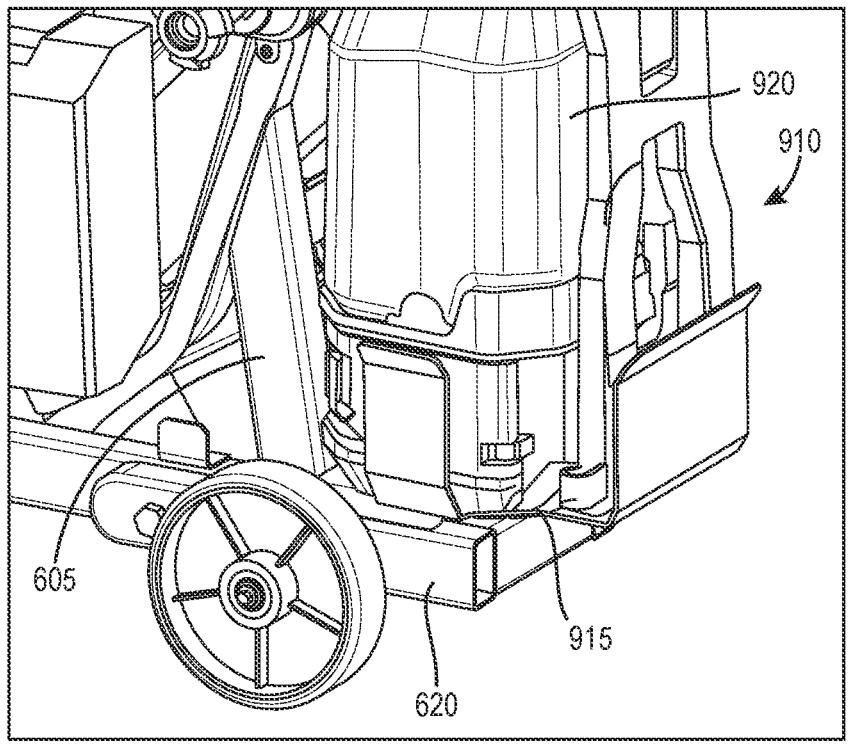
FIG. 17 is a rear perspective view of the cart of FIG. 1 supporting the water tank.
Figure 19:
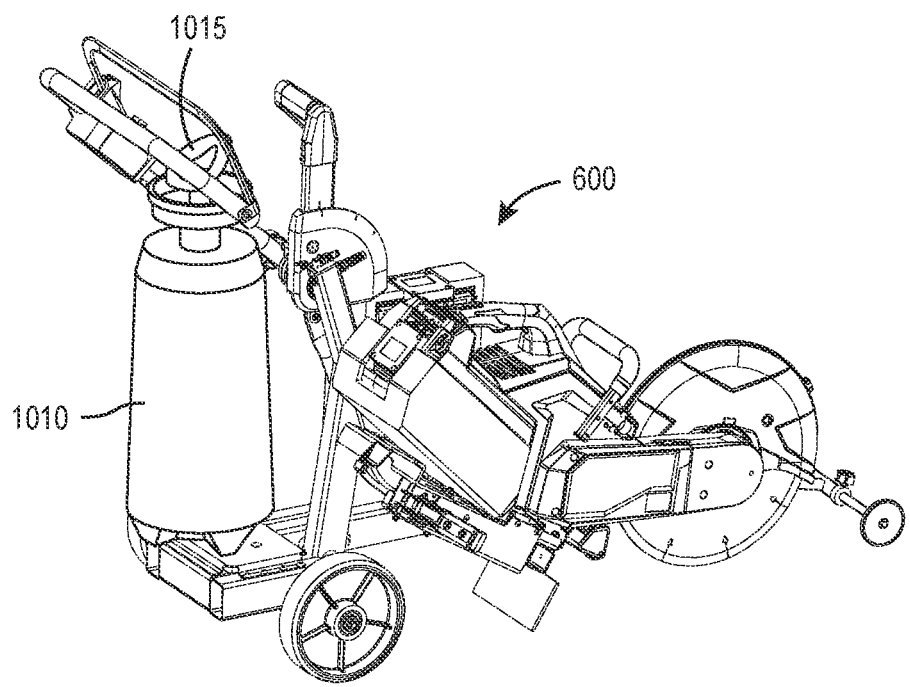
FIG. 19 is a rear perspective view of the cart of FIG. 1 supporting a water tank according to another embodiment of the invention.

With reference to FIGS. 16 and 17, the cart 600 also includes a blade wetting system 910 for providing fluids (i.e., water) to the fluid distribution system 150 of the saw 15. The blade wetting system 910 includes a mounting plate 915 and a tank 920. The mounting plate 915 is supported on the rear wheel assembly 620 using fasteners or the like. The mounting plate 915 includes a plurality of resilient brackets 925 extending upwards from each side of the mounting plate 915. The perimeter defined by the brackets 925 is smaller than the perimeter of the bottom of the tank 920. As such, when the tank 920 is positioned on the mounting plate 915, the brackets 925 are deflected away from their resting position by the tank 920. The resiliency of the brackets 925 apply a clamping force to the tank 920 to secure it in place. In the illustrated embodiment, the tank 920 is a powered liquid sprayer, such as that disclosed in U.S. patent application Ser. No. 16/040,320 filed on Jul. 19, 2018, now U.S. Patent Application Publication No. 2019/0030554, the entire content of which is incorporated herein by reference. As such, the tank 920 includes a motor that automatically pressurizes the fluid within the tank 920. In other embodiments, such as the one illustrated in FIG. 19, the cart 600 may support a manual tank 1010 requiring a user to manual pressurize the fluid within the tank 1010 with a hand pump 1015. The tank 920 includes a supply line (not shown) that distributes fluid from an outlet valve to the connector 155 of the fluid distribution system 150. The outlet valve may be electrically controlled to automatically stop water flow when the saw 15 is deactivated.

Figure 18:
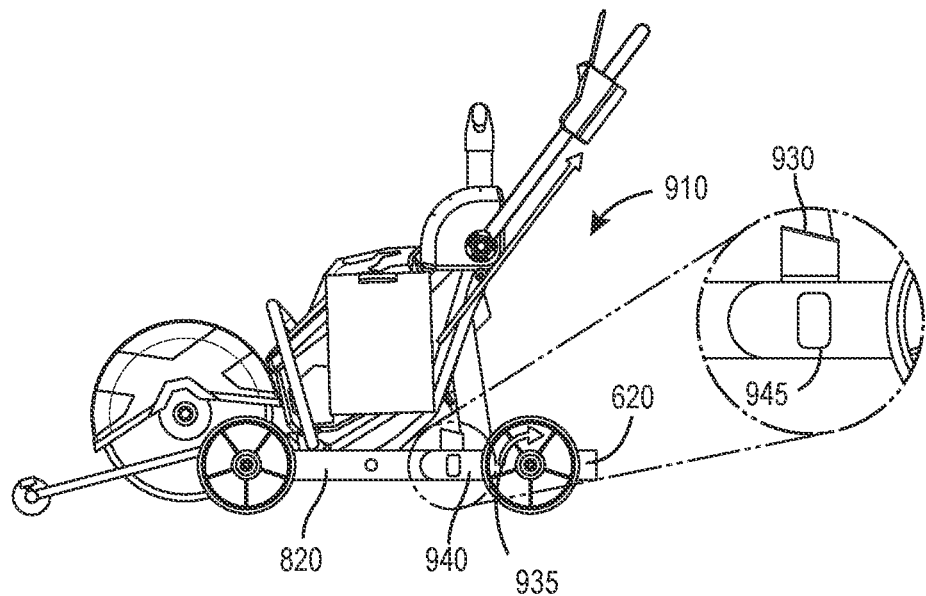
FIG. 18 is a side view of the cart of FIG. 1 illustrating a stop for the water tank.

With reference to FIG. 18, the blade wetting system 910 is pivotable relative to the wheel arm 820. A mechanical stop 930 is positioned on the wheel arm 820 to prevent the over-travel of the blade wetting system 910 relative to the wheel arm 820. Specifically, the mechanical stop 930 prevents over-travel in the direction indicated by arrow 935. The mechanical stop 930 is a bracket that extends from the wheel arm 820 over a frame portion 940 of the rear wheel assembly 620. In other embodiments, the mechanical stop 930 may be positioned inside the wheel arm 820 or elsewhere on the cart 600. A spring-loaded pin 945 is positioned on the rear wheel assembly 620 to bias the rear wheel assembly 620 and the blade wetting system 910 to a home position, in which, the wheel arm 820 is aligned with the frame portion 940 of the rear wheel assembly 620. The pivoting of the blade wetting system 910 relative to the wheel arm 820 allows slack to be provided to the supply line when the cart 600 is traveling, which inhibits the supply line from detaching from either of the connectors.

Various features and advantages are set forth in the following claims.

What is claimed is:

1. A cart for carrying a cut-off saw having a saw blade, a motor drivably coupled to the saw blade, a saw control unit configured to selectively activate the motor in response to a first input control signal from a trigger, and a first connector in communication with the saw control unit, the cart comprising:
   a remote actuation system including
      a cart control unit,
      a throttle configured to provide an input to the cart control unit, and
      a second connector configured to connect with the first connector of the cut-off saw; and
   a wire interconnecting the cart control unit and the first connector, the wire configured to transmit a second input control signal from the cart control unit to the saw control unit upon receiving the input from the throttle, via the first and second connectors, to selectively activate and vary a rotational speed of the motor and the saw blade.

2. The cart of claim 1, further comprising a frame and a handle coupled to the frame.

3. The cart of claim 2, wherein the wire extends through a portion of the handle and/or the frame.

4. The cart of claim 2, wherein the throttle is a throttle lever pivotably coupled to the handle to provide the input to the cart control unit.

5. The cart of claim 2, wherein the cart control unit is positioned on the handle.

6. The cart of claim 1, wherein the second connector mechanically and electrically connects to the first connector via the wire.

7. The cart of claim 1, wherein the cart control unit includes an actuator operable in a first mode, in which the cart control unit is incapable of transmitting the second input control signal, and a second mode, in which the cart control unit is capable of transmitting the second input control signal.

8. The cart of claim 7, wherein when the actuator is in the second mode, the throttle is moveable to provide the input to the cart control unit to selectively activate and vary the rotational speed of the motor and the saw blade.

9. The cart of claim 7, wherein the actuator is a pushbutton switch.

10. The cart of claim 7, wherein the actuator is moveable between a first position, in which the cart control unit is in the first mode, and a second position, in which the cart control unit is in the second mode.

11. A cart for carrying a cut-off saw having a saw blade, a motor drivably coupled to the saw blade, a saw control unit configured to selectively activate the motor in response to a first input control signal from a trigger, and a first wireless communication device in communication with the saw control unit, the cart comprising:
   a remote actuation system including
      a cart control unit,
      a throttle configured to provide an input to the cart control unit, and
      a second wireless communication device in communication with the first wireless communication device;
   wherein the second wireless communication device is configured to send a second input control signal to the first wireless communication device, upon receiving the input from the throttle, to selectively activate and vary a rotational speed of the motor and the saw blade.

12. The cart of claim 11, further comprising a frame and a handle coupled to the frame.

13. The cart of claim 12, wherein the throttle is a throttle lever pivotably coupled to the handle to provide the input to the cart control unit.

14. The cart of claim 12, wherein the cart control unit is positioned on the handle.

15. The cart of claim 11, wherein the cart control unit includes an actuator operable in a first mode, in which the cart control unit is incapable of transmitting the second input control signal, and a second mode, in which the cart control unit is capable of transmitting the second input control signal.

16. The cart of claim 15, wherein when the actuator is in the second mode, the throttle is moveable to provide the input to the cart control unit to selectively activate and vary the rotational speed of the motor and the saw blade.

17. The cart of claim 15, wherein the actuator is a push-button switch.

18. The cart of claim 15, wherein the actuator is moveable between a first position, in which the cart control unit is in the first mode, and a second position, in which the cart control unit is in the second mode.

19. A system comprising:
- a cut-off saw having a saw blade, a motor drivably coupled to the saw blade, a saw control unit configured to selectively activate the motor in response to a first input control signal, and a first communication means to provide an input to the saw control unit; and
- a cart for carrying the cut-off saw, the cart including a remote actuation system having a cart control unit, a throttle configured to provide an input to the cart control unit, and a second communication means configured to interface with the first communication means of the cut-off saw;

wherein the cart control unit transmits a second input control signal to the saw control unit upon receiving the input from the throttle, via the first and second communication means, to selectively activate and vary a rotational speed of the motor and the saw blade.

20. The system of claim 19, wherein the first communication means is a first connector and the second communication means is a second connector to provide the second input control signal to the saw control unit, and wherein the cart further comprises a wire interconnecting the first and second connectors.

21. The system of claim 19, wherein the first communication means is a first wireless communication device, and wherein the second communication means is a second wireless communication device to wirelessly transmit the second input control signal to the saw control unit.

* * * * *